United States Patent
Oliver et al.

(10) Patent No.: US 8,028,343 B2
(45) Date of Patent: Sep. 27, 2011

(54) SCANNING PROBE MICROSCOPE WITH INDEPENDENT FORCE CONTROL AND DISPLACEMENT MEASUREMENTS

(75) Inventors: Warren C. Oliver, Knoxville, TN (US); John Swindernan, Knoxville, TN (US); Jennifer Hay, Knoxville, TN (US); Karmit Parks, Knoxville, TN (US)

(73) Assignee: Nanonmechanics, Inc., Oak Ridge, TN (US)

( * ) Notice: Subject to any disclaimer, the term of this patent is extended or adjusted under 35 U.S.C. 154(b) by 155 days.

(21) Appl. No.: 12/362,359

(22) Filed: Jan. 29, 2009

(65) Prior Publication Data

US 2010/0192267 A1    Jul. 29, 2010

(51) Int. Cl.
*G01Q 20/02* (2010.01)
*G01Q 10/00* (2010.01)
*G01Q 90/00* (2010.01)

(52) U.S. Cl. ......... 850/6; 850/1; 850/5; 850/62; 850/63; 356/28.5; 356/35.5; 356/450; 356/452; 356/477

(58) Field of Classification Search ............ 850/21, 850/30, 31, 34, 35, 36, 46, 62, 63, 1, 5, 6; 356/28.5, 35.5, 450, 452, 477
See application file for complete search history.

(56) References Cited

U.S. PATENT DOCUMENTS

| | | | |
|---|---|---|---|
| 5,025,658 A | | 6/1991 | Eilings et al. |
| 5,557,156 A | * | 9/1996 | Elings ............... 310/316.01 |
| 2004/0153292 A1 | | 8/2004 | Hay |
| 2005/0283985 A1 | | 12/2005 | Yang et al. |
| 2006/0225164 A1 | * | 10/2006 | Williams et al. ............ 977/852 |
| 2007/0227236 A1 | | 10/2007 | Bonilla et al. |
| 2008/0210854 A1 | * | 9/2008 | Jindai et al. .................. 250/281 |
| 2009/0249520 A1 | * | 10/2009 | Anderson ....................... 850/30 |

OTHER PUBLICATIONS

B.N. Lucas and W.C. Oliver, Indentation Power-Law Creep of High-Purity Indium; Metallurgical and Materials Transactions A, vol. 30A, Mar. 1999, pp. 601-610.

Lucas, Barry Neal, An Experimental Investigation of Creep and Viscoelastic Properties Using Depth-Sensing Indentation Techniques; A Dissertation Presented for the Doctor of Philosophy Degree, The University of Tennessee, Knoxville, May 1997; pp. 1-251.

* cited by examiner

*Primary Examiner* — Robert Kim
*Assistant Examiner* — Nicole Ippolito Rausch
(74) *Attorney, Agent, or Firm* — Luedeka, Neely & Graham, P.C.

(57) ABSTRACT

A nanoindenter that includes an interferometer, a rod, a force actuator and a controller is disclosed. The interferometer generates a light beam that is reflected from a moveable reflector, the interferometer determining a distance between a reference location and the moveable reflector. The rod is characterized by a rod axis and includes a tip on a first end thereof, the rod includes the moveable reflector at a location proximate to the tip. The tip is disposed in a manner that allows the tip to be forced against the surface of a sample. The force actuator applies a force to the rod in a direction parallel to the rod axis in response to a force control signal coupled to the actuator. The controller receives the determined distance from the interferometer and generates the force control signal. The invention can also be used as a scanning probe microscope.

17 Claims, 2 Drawing Sheets

SCANNING PROBE MICROSCOPE WITH INDEPENDENT FORCE CONTROL AND DISPLACEMENT MEASUREMENTS

BACKGROUND OF THE INVENTION

Scanning probe microscopes such as atomic force microscopes are widely used for imaging the surface of samples at the atomic level; however, these microscopes are not well suited for measuring the deformation properties of samples at these levels. Scanning probe microscopes enable a class of imaging techniques in which a tip that interacts locally with a sample is scanned over the surface of the sample to generate a three-dimensional image representing the properties of the surface. The tip is typically mounted on a cantilevered arm having a fixed end that can be moved vertically relative to the sample. For example, in contact mode atomic force microscopy, as the tip is moved over the surface of the sample, the arm deflects in response to changes in the topology of the surface. The vertical position of the cantilever arm relative to the sample is adjusted to maintain the arm in a predetermined state. The vertical position as a function of position on the sample can then be used to provide an image of the surface. Typically, scanning force microscopes seek to minimize the deformation of the sample.

In the AC, or non-contact mode, the tip and arm are oscillated at a frequency near the resonant frequency of the arm. The height of the tip can be controlled such that the tip avoids contact with the sample surface, sampling short-range tip/sample forces or the tip can be allowed to make light intermittent contact with the sample only at the bottom of the oscillation cycle. Contact between the probe tip and the sample results in an alteration of the amplitude, phase and/or frequency of the oscillation. The controller adjusts the height of the probe over the sample such that the oscillation amplitude, phase and/or frequency is kept at a predetermined constant value.

There are a number of applications in which the deformation of the sample as a function of an applied force must be measured. The areas to be sampled are of the dimensions of a scanning probe tip. Scanning probe microscopes are poorly suited for such measurements. The force that is applied by the tip to the surface of the sample is determined by the deflection of the cantilever arm. As the fixed end of the cantilever arm is moved toward the sample while the tip is in contact with the sample, the arm bends and a greater force is exerted, and the arm bends further. Part of the force causes the tip to penetrate the sample, and part of the force deforms the arm. The force applied at the tip depends on the bending of the arm; hence, to determine the force, the degree of bending of the arm must be accurately measured, and the arm must be calibrated. In addition, the degree of penetration of the tip into the arm must be independently measured. Such measurements present significant challenges.

To overcome these problems, a class of devices referred to as "nanoindenters" has been developed. In a nanoindenter, the force that is applied to the tip is independent of the position of the tip relative to the sample surface. Such measurements require displacement measurement with accuracies in the nanometer range. Forces of the order of 10 mN are applied to a tip having a radius of curvature of the order of 100 nm. These measurements can be used to determine the mechanical properties of the sample such as the elastic modulus and hardness.

In one class of nanoindenter, the tip is mounted on one end of a rod. The other end of the rod includes a mechanism for generating a known force to the rod. A separate position measuring mechanism is used to determine the position of the end of the rod. Typically, the position is determined by measuring the change in capacitance of a capacitor having one plate attached to the rod and the other plate fixed with respect to the apparatus. In one prior art arrangement, a three-plate structure is utilized in which the moveable plate is between two fixed plates and changes in the ratio of the capacitances is measured.

While such nanoindenters provide significant improvements over a scanning probe microscope for making deformation measurements, these designs are subject to other problems. First, the measurement of the tip position by measuring the position of the rod assumes that the length of the rod remains constant during the course of the measurements. The distances being measured are of the order of nanometers. Hence, changes in length of the arm due to the thermal expansion or contraction of the rod itself over the course of the measurements can introduce significant errors.

Second, the accuracy of the capacitive position measurements is insufficient for many applications and the time needed between measurements can be excessive. Capacitance measurements typically involve measuring the shift in the resonant frequency of a circuit having the capacitor in question as an element thereof. The settling time for such measurements after changes in the capacitance can increase the time between measurements if high accuracy is needed. Hence, in applications in which a detailed map of the properties of a surface is to be measured, the scanning time can be excessive.

SUMMARY OF THE INVENTION

The present invention includes a nanoindenter and methods for using the same. The nanoindenter includes an interferometer, a rod, a force actuator and a controller. The interferometer generates a light beam that is reflected from a moveable reflector, the interferometer determining a distance between a reference location and the moveable reflector. The rod is characterized by a rod axis and includes a tip on a first end thereof, the rod includes the moveable reflector at a location proximate to the tip. The tip is disposed in a manner that allows the tip to be forced against the surface of a sample. The force actuator applies a force to the rod in a direction parallel to the rod axis in response to a force control signal coupled to the actuator. The controller receives the determined distance from the interferometer and generates the force control signal. In one aspect of the invention, a stage actuator moves the sample in a plane perpendicular to the rod axis such that portions of the sample are contacted by the tip.

In one aspect of the invention, the rod includes a cavity extending from the first end of the rod to a second end of the rod. The reflector is mounted within the cavity such that the reflector reflects light incident on the cavity from the second end.

In one embodiment, the force actuator includes a magnet and coil. One of the magnet or the coil is part of the rod and the other is fixed to the frame. The force is generated by applying a signal to the coil.

DETAILED DESCRIPTION OF THE PREFERRED EMBODIMENTS OF THE INVENTION

Figure 1:
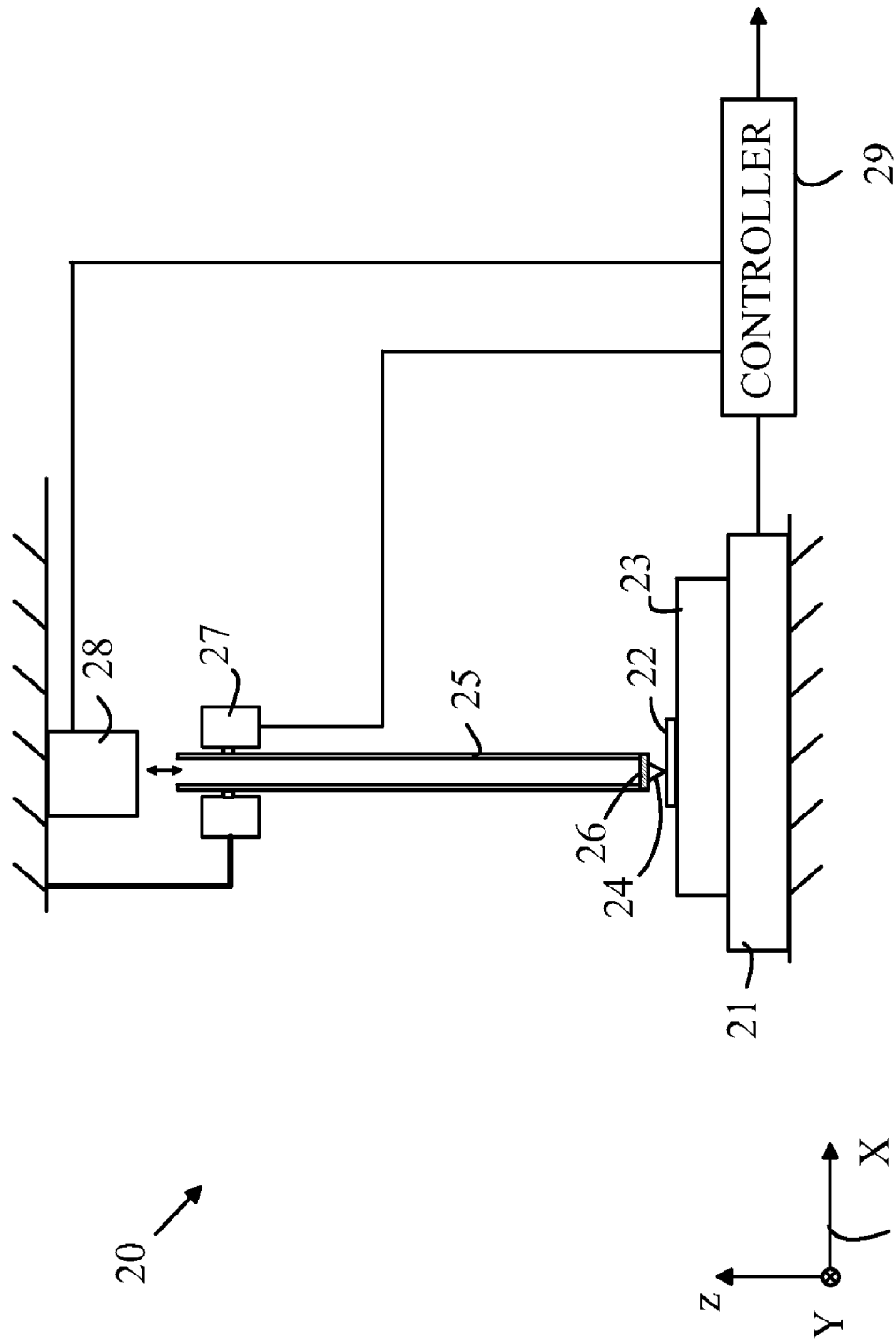
FIG. 1 is cross-sectional view of a nanoindenter according to one embodiment of the present invention.

The manner in which the present invention provides its advantages can be more easily understood with reference to FIG. 1, which is cross-sectional view of a nanoindenter according to one embodiment of the present invention that is being utilized to measure the properties of a sample 22. Nanoindenter 20 includes a probe that includes a rod 25 having a tip 24 attached to one end thereof. Rod 25 is hollow and includes a mirrored surface 26 that reflects light generated by an interferometer 28. Mirrored surface 26 is mounted proximate to tip 24. The mirrored surface is defined to be proximate to tip 24 if the mirror is sufficiently close to tip 24 that any changes in the distance between mirrored surface 26 and tip 24 due to thermal fluctuations in the intervening material during the course of the measurements will not cause a significant error in the determination of the distance between mirror surface 26 and interferometer 28. The maximum error that can be tolerated is determined by the accuracy needed in determining the location of the tip as a function of the force applied to the tip, and hence, will depend on the particular application of the nanoindenter. If the nanoindenter is being used to map the surface topology of the sample, the maximum tolerable error will be determined by the topological accuracy required in the image of the surface.

The force exerted by tip 24 on sample 22 is determined by an actuator 27 that is under the control of a controller 29. It should be noted that the force determining mechanism is independent of the distance determining mechanism, i.e., interferometer 28, and hence, the problems associated with cantilever arm arrangements are avoided.

Nanoindenter 20 can also include a stage 23 that moves relative to rod 25 via an actuator 21 that is under the control of controller 29. In the embodiment shown in FIG. 1, the stage provides movements in three orthogonal directions as indicated by the coordinate system shown at 31. However, other arrangements that allow the specimen to move relative to the probe tip could be utilized. For, example, a first actuator that moves the specimen relative to tip 24 in the z-direction while a second actuator moves the sample in the x-y plane could also be constructed.

As noted above, actuator 27 determines the force with which tip 24 is pressed into the surface of specimen 22. The forces involved in a typical nanoindenter measurement are of the order of a mN. The probe will typically weigh more than a gram and the rod is arranged vertically. In this configuration, actuator 27 must support the weight of the probe when the applied force is at the minimum value. A mechanism within actuator 27 exerts an additional force on rod 27 having a magnitude determined by controller 29. The depth to which tip 24 penetrates the specimen surface is then measured using interferometer 28.

Figure 2:
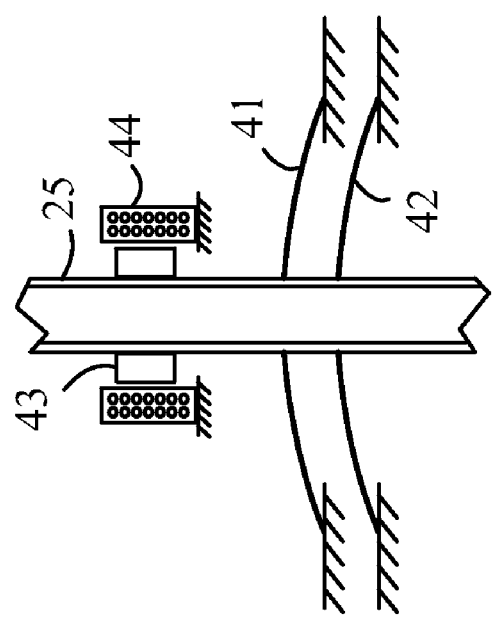
FIG. 2 is a cross-sectional view of a portion of rod 25 that provides a more detailed view of one embodiment of an actuator mechanism.

Refer now to FIG. 2, which is a cross-sectional view of a portion of rod 25 showing a more detailed view of an actuator mechanism that could be used to apply a known force to tip 24 when tip 24 is in contact with the surface of the specimen being measured. Rod 25 is connected to leaf springs 41 and 42 that support the weight of rod 25. The leaf springs must support rod 25 while assuring that rod 25 can move freely in a direction perpendicular to the sample surface while being inhibited from moving in a plane parallel to the surface of the sample. The leaf springs in this embodiment are constructed from slotted disks to assure that motion in a plane parallel to the specimen surface is inhibited. The springs are separated in space to further restrict the motion of rod 25 to directions perpendicular to the specimen surface.

In this embodiment of the present invention, the actuator that applies the force to tip 24 is an electromechanical actuator comprising a magnet 43 attached to rod 25 and a drive coil 44 through which a current passes under the control of controller 29. The magnitude of the current determines the force that is applied between the tip and the sample. The relationship between the current and the force also depends on the spring constants of springs 41 and 42 and on the mass of rod 25 and the objects attached thereto. The relationship can be measured by measuring the force applied to a force measurement device for each of a plurality of currents when the sample is replaced by the force measurement device.

The embodiment shown in FIG. 2 includes a magnet that is separate from rod 25. However, the magnet could be incorporated in the rod by utilizing a magnetic material for the rod. Alternatively, a ferromagnetic material could be deposited on the outer surface of the rod in the region that passes through coil 44. Such arrangements reduce the mass that must be moved in relation to the sample during repeated measurements.

Figure 3:
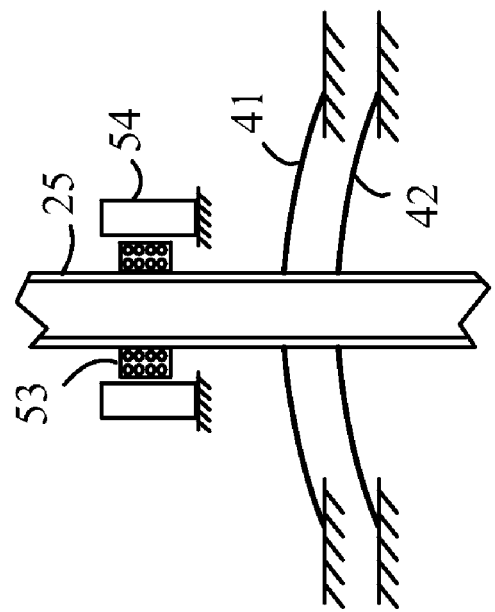
FIG. 3 is a cross-sectional view of a portion of rod 25 that provides a more detailed view of another embodiment of an actuator mechanism.

Refer now to FIG. 3, which is a cross-sectional view of a portion of rod 25 showing an alternative coil-magnet actuator mechanism. The actuator mechanism shown in FIG. 3 differs from that shown in FIG. 2 in that a coil 53 is attached to rod 25 and a magnet 54 is attached to the frame. This embodiment has the advantage of reducing the mass that is attached to rod 25, since the magnets typically weigh more than the coil for the range of forces of interest in many applications.

While the embodiment shown in FIGS. 2 and 3 utilizes a coil and magnetic transducer, other forms of actuator could be utilized. For example, electrostatic actuators, piezoelectric transducers or magnetostrictive transducers could be utilized.

A nanoindenter according to the present invention can also be used to generate an image of the surface in a manner analogous to a scanning probe microscope operating in contact mode. For each point of interest on the sample, the force on the probe tip is held at a predetermined force. The predetermined force can be a constant or changed in someway from point to point or changed through some range at each point. At each point on the sample the position of the probe tip is read by the interferometer for each force value. The vertical position of the probe tip for a particular force can be used to generate an image of the surface that is substantially the same at the image obtained by a scanning probe microscope in contact mode. Hence, a separate scanning mode microscope is not needed.

It should be noted that scanning probe microscopes require that significantly higher masses be moved vertically at each (x,y) point on the sample being scanned. In a conventional scanning probe microscope, the cantilever arm assembly is attached to an actuator that must be moved with the cantilever arm assembly vertically to track the topology of the sample. The mass of the combination of the actuator and cantilever arm can be significantly greater than the mass of the rod assembly in the present invention. Further, the rod is supported by the springs, and hence, the force that must be applied to move the rod is significantly reduced. Hence, the present invention can be adjusted vertically in significantly shorter times than a conventional scanning probe microscope that is operated in contact mode. As a result, the present invention provides higher data acquisition rates.

It should also be noted that compared to capacitively sensed nanoindenters, the mass that is being moved in the present invention is also significantly less, and hence, the time needed to move the probe tip is significantly reduced compared to capacitively sensed nanoindenters. In a capacitive sensor, one of the plates of the capacitor is attached to the rod and must be moved. The mass of the plate is significantly greater than the mass of the portion of the actuator that is attached to the rod in the embodiments discussed above. Hence, the present invention can provide higher natural, resonant frequencies, and therefore data acquisition rates, than prior art nanoindenters.

It should also be noted that the available range of motion obtainable with a capacitive sensor is significantly less than the range of motion that can be detected utilizing an interferometer. An interferometer can provide the needed accuracy over a range of motion of several millimeters with a uniform resolution over that range. The capacitance of a capacitor sensor decreases as the plate separation increases, and hence, the resolution also decreases as the range of motion increases. In principle, the size of the plates can be increased to provide improved resolution; however, such an increase would result in an increase in the mass that must be moved by the rod.

In the above-described embodiments of the present invention, the force that is applied to the rod is constant. However, embodiments in which the force that is applied varies in time could also be constructed. For example, the current passing through coil 44 shown in FIG. 2 could be an AC current of one or more frequencies and amplitudes with a DC component. One example of the use of such a force is to measure the stiffness of the sample as the probe is slowly forced into the sample.

A nanoindenter according to the present invention can also be utilized to scribe the surface of a sample. In such embodiments, the tip is applied to the surface with sufficient force to cause the tip to penetrate the surface to the desired distance. The sample is then moved in the desired path utilizing the x-y stage discussed in the embodiments shown in FIG. 1.

The above-described embodiments of the present invention utilize an arrangement in which the rod moves vertically; however, other arrangements could be utilized. In principle, the support mechanism for the rod could be altered to allow the rod to move horizontally or in any direction relative to the ground.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising:
   a rod characterized by a rod axis, said rod comprising a tip on a first end thereof and a cavity extending from said first end of said rod to a second end of said rod, said rod comprising a moveable reflector mounted within said cavity at a location proximate to said tip, said tip being disposed such that said tip is forced against a sample when a force is applied to said rod;
   an interferometer that generates a light beam within said cavity that is reflected from said moveable reflector, said interferometer determining a distance between a reference location and said moveable reflector;
   a force actuator that applies a force to said rod in a direction parallel to said rod axis in response to a force control signal coupled to said actuator;
   a controller that receives said determined distance from said interferometer and generates said force control signal; and
   a stage actuator that moves a sample in a plane perpendicular to said rod axis such that portions of said sample are contacted by said tip.

2. The apparatus of claim 1 wherein said force actuator comprises a coil and a magnet.

3. The apparatus of claim 2 wherein said rod is magnetic, said rod acting as said magnet.

4. The apparatus of claim 2 wherein said coil is attached to said rod.

5. The apparatus of claim 2 wherein said rod comprises a ferromagnetic coating that passes through said coil.

6. The apparatus of claim 1 wherein said force actuator comprises an electrostatic actuator.

7. The apparatus of claim 1 wherein said force actuator comprises a piezoelectric transducer.

8. The apparatus of claim 1 wherein said force actuator comprises a magnetostrictive transducer.

9. The apparatus of claim 1 wherein said controller measures said distance for each of a plurality of different forces applied by said force actuator at the same location on said sample.

10. The apparatus of claim 1 wherein said controller measures said distance at a plurality of different locations on said sample when said force actuator applies the same force to said sample at each of said locations.

11. The apparatus of claim 1 wherein said force actuator applies an oscillating force to said rod.

12. The apparatus of claim 1 wherein said tip is on said rod axis and said force actuator applies said force to said tip coaxially with said rod axis.

13. A method for measuring a property of a sample, said method comprising:
   providing a rod characterized by a rod axis, said rod comprising a tip on a first end thereof and a cavity extending from said first end of said rod to a second end of said rod, said rod comprising a moveable reflector mounted within said cavity at a location proximate to said tip;
   applying a force to said rod in a direction parallel to said rod axis thereby causing said tip to press on said sample; and
   determining a distance from a fixed reference point to said moveable reflector utilizing an interferometer that generates a light beam within said cavity that is reflected from said movable reflector.

14. The method of claim 13 further comprising repeating said distance determination for a plurality of different force values at a single location on said sample.

15. The method of claim 13 further comprising repeating said distance determination for a plurality of different locations on said sample while applying said force at each of said locations.

16. The method of claim 13 wherein said force comprises an oscillating force.

17. The method of claim 13 wherein said tip is on said rod axis and said force is applied to said tip coaxially with said rod axis.

* * * * *

UNITED STATES PATENT AND TRADEMARK OFFICE
CERTIFICATE OF CORRECTION

PATENT NO. : 8,028,343 B2  
APPLICATION NO. : 12/362359  
DATED : September 27, 2011  
INVENTOR(S) : Warren C. Oliver et al.

Page 1 of 1

It is certified that error appears in the above-identified patent and that said Letters Patent is hereby corrected as shown below:

Title Pg, Item (75), the inventors should read:

-- Warren C. Oliver, Knoxville, TN (US)  
John Swindeman, Knoxville, TN (US)  
Jennifer Hay, Knoxville, TN (US)  
Kermit Parks, Knoxville, TN (US) --.

Signed and Sealed this  
Twenty-ninth Day of November, 2011

David J. Kappos  
*Director of the United States Patent and Trademark Office*